US007162315B2

(12) United States Patent
Gilbert

(10) Patent No.: US 7,162,315 B2
(45) Date of Patent: *Jan. 9, 2007

(54) DIGITAL AUDIO COMPENSATION

(75) Inventor: Erik J. Gilbert, Los Altos Hills, CA (US)

(73) Assignee: Placeware, Inc., Mountain View, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 10/868,570

(22) Filed: Jun. 15, 2004

(65) Prior Publication Data

US 2005/0021327 A1 Jan. 27, 2005

Related U.S. Application Data

(62) Division of application No. 09/216,315, filed on Dec. 18, 1998, now Pat. No. 6,763,274.

(51) Int. Cl.
*G06F 17/00* (2006.01)

(52) U.S. Cl. ........................................ 700/94; 370/505

(58) Field of Classification Search .................. 700/94; 370/505–517

See application file for complete search history.

(56) References Cited

U.S. PATENT DOCUMENTS 5,526,362 A 6/1996 Thompson et al.
5,768,263 A 6/1998 Tischler et al.
5,825,771 A 10/1998 Cohen et al.
6,088,412 A 7/2000 Ott
6,449,291 B1 9/2002 Burns et al.
6,763,274 B1 * 7/2004 Gilbert ........................ 700/94

OTHER PUBLICATIONS

Siegler, Matthew A. et al., "Automatic Segmentation, Classification, and Clustering of Broadcast News Audio," ECE Department-Speech Group, Carnegie Mellon University 1997 (7 pages).
"Digital Cellular Telecommunications System: Voice Activity Detection (VAD) (GSM 06.32)," European Telecommunications Standard Institute, European Telecommunications Standard Third Edition, Oct. 1996 (40 pages).
L. Delgrossi et al., "Internet Stream Protocol Version 2 (ST2) Protocol Specification—Version ST2+," Internet Engineering Task Force, Network Working Group; Request for Comments 1819, Aug. 1995 (98 pages).
H. Schulzrinne et al., "RTP: A Transport Protocol for Real-Time Applications," Internet Engineering Task Force, Network Working Group; Request for Comments 1889, Jan. 1996 (65 pages).
H. Schulzrinne et al., "RTP Protocol for Audio and Video Conferences with Minimal Control," Internet Engineering Task Force, Network Working Group; Request for Comments 1890, Jan. 1996 (16 pages).
Postel, J. et al., "User Datagram Protocol," IETF RFC 768, Aug. 28, 1980 (3 pages).

* cited by examiner

*Primary Examiner*—Brian T. Pendleton
(74) *Attorney, Agent, or Firm*—Perkins Coie LLP

(57) ABSTRACT

A method and apparatus for audio compensation is disclosed. If audio input components and audio output components are not driven by a common clock (e.g., input and output systems are separated by a network, different clock signals in a single computer system), input and output sampling rates may differ. Also, network routing of the digital audio data may not be consistent. Both clock synchronization and routing considerations can affect the digital audio output. To compensate for the timing irregularities caused by clock synchronization differences and/or routing changes, the present invention adjusts periods of silence in the digital audio data being output. The present invention thereby provides an improved digital audio output.

32 Claims, 3 Drawing Sheets

DIGITAL AUDIO COMPENSATION

This application is a division of Ser. No. 09/216,316 filed Dec. 18, 1998 now U.S. Pat. No. 6,763,274.

FIELD OF THE INVENTION

The present invention relates to communication of digital audio data. More particularly, the present invention relates to modification of digital audio playback to compensate for timing differences.

BACKGROUND OF THE INVENTION

Technology currently exists that allows two or more computers to exchange real time audio and video data over a network. This technology can be used, for example, to provide video conferencing between two or more locations connected by the Internet. However, because participants in the conference use different computer systems, the sampling rates for audio input and output may differ.

For example, two computer systems having sampling rates labeled "8 kHz" may have slightly different actual sampling rates. Assuming that a first computer has an actual audio input sampling rate of 8.1 kHz and a second computer has an actual audio output rate of 7.9 kHz, the computer system outputting the audio data is falling behind the input computer system at a rate of 200 samples per second. The result can be unnatural gaps in audio output or loss of audio data. Over an extended period of time, audio output may fall behind video output such that the video output has little relation to the audio output.

Another shortcoming of real time network audio is known as "jitter." As network routing paths or packet traffic volume change, as is common with the Internet, a short interruption may be experienced as a result of the time difference required to traverse a first route as compared to a second route. The resulting jitter can be annoying or distracting to a listener of the digital audio received over the network.

What is needed is an audio compensation scheme that compensates for audio timing differences between input and output.

SUMMARY OF THE INVENTION

A method and apparatus for digital audio compensation is described. A timing relationship between an audio input and an audio output is determined. A period of silence within an audio segment is identified and the length of the period of silence is adjusted based, at least in part, on the timing relationship between the audio input and the audio output.

In one embodiment, the timing relationship is determined based on a difference between time stamps for a first data packet and a second data packet, and a period of time required to play the first data packet. In one embodiment, audio samples from the period of silence are removed or replicated to shorten or lengthen, respectively, the period of silence to compensate for differences between the audio input and the audio output. Modification of the period of silence can be used to compensate for both differences between input and output rates and for jitter caused by network routing.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

A method and apparatus for digital audio compensation is described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention provides a method and apparatus for time compensation of digital audio data. If audio input components and audio output components are not driven by a common clock (e.g., input and output systems are separated by a network, different clock signals in a single computer system), input and output rates may differ. Also, network routing of the digital audio data may not be consistent. Both clock synchronization and routing considerations can affect the digital audio output. To compensate for the timing irregularities caused by clock synchronization differences and/or routing changes, the present invention adjusts periods of silence in the digital audio data being output. The present invention thereby provides an improved digital audio output.

Figure 1:
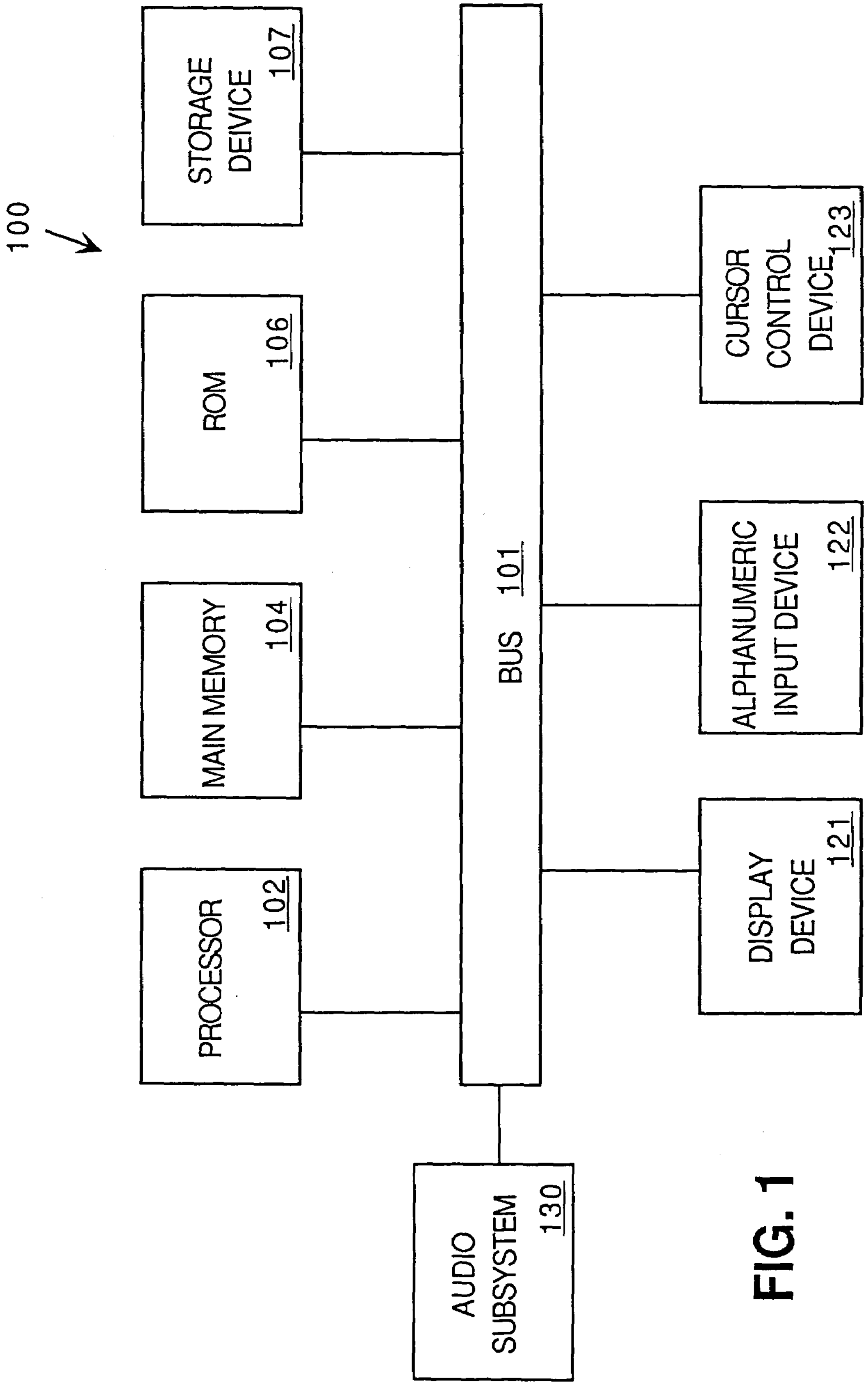
FIG. 1 is one embodiment of a computer system suitable for use with the present invention.

FIG. 1 is one embodiment of a computer system suitable for use with the present invention. Computer system 100 includes bus 101 or other communication device for communicating information, and processor 102 coupled with bus 101 for processing information. Computer system 100 further includes random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also includes read only memory (ROM) and/or other static storage device 106 coupled to bus 101 for storing static information and instructions for processor 102. Data storage device 107 is coupled to bus 101 for storing information and instructions.

Data storage device 107 such as a magnetic disk or optical disc and corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

Audio subsystem 130 includes digital audio input and/or output devices. In one embodiment audio subsystem 130 includes a microphone and components (e.g., analog-to-digital converter, buffer) to sample audio input at a predetermined sampling rate (e.g., 8 kHz) to generate digital audio data. Audio subsystem 130 further includes one or more speakers and components (e.g., digital-to-analog converter, buffer) to output digital audio data at a predetermined rate in the form of audio output. Audio subsystem 130 can also include additional or different components and operate at different frequencies to provide audio input and/or output.

The present invention is related to the use of computer system 100 to provide digital audio compensation. According to one embodiment, digital audio compensation is performed by computer system 100 in response to processor 102 executing sequences of instructions contained in main memory 104.

Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software.

Figure 2:
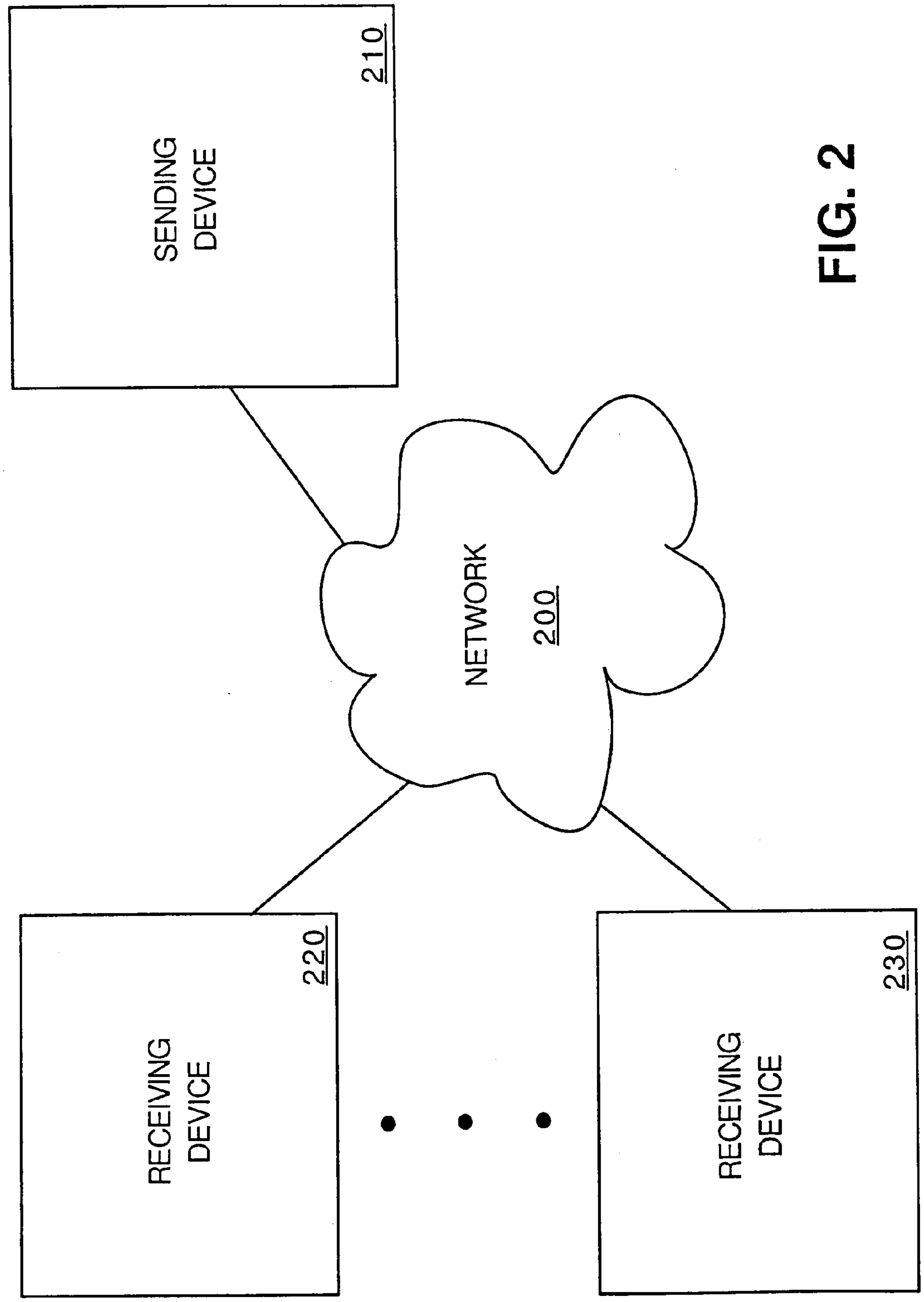
FIG. 2 is an interconnection of devices suitable for use with the present invention.

FIG. 2 is an interconnection of devices suitable for use with the present invention. In one embodiment the devices of FIG. 2 are computer systems, such as computer system 100 of FIG. 1, however, the devices of FIG. 2 can be other types of devices. For example, the devices of FIG. 2 can be "set-top boxes" or "Internet terminals" such as a WebTV™ terminal available from Sony Electronics, Inc. of Park Ridge, N.J., or a set-top box using a cable modem to access a network such as the Internet. Alternatively, the devices can be "dumb" terminals or thin client devices such as the ThinSTAR™ available from Network Computing Devices, Inc. of Mountain View, Calif.

Network 200 provides an interconnection between multiple devices sending and/or receiving digital audio data. In one embodiment, network 200 is the Internet; however, network 200 can be any type of wide area network (WAN), local area network (LAN), or other interconnection of multiple devices. In one embodiment, network 200 is a packet switched network where data is communicated over network 200 in the form of packets. Other network protocols can also be used.

Sending device 210 is a computer system or other device that is receiving and/or generating audio and/or video input. For example, if sending device 210 is involved with a video conference, sending device 210 receives audio and/or video input from one or more participants of the video conference using sending device 210. Sending device 210 can also be used to communicate other types of real time or recorded audio and/or video data.

Receiving devices 220 and 230 receive video and/or audio data from sending device 210 via network 200. Receiving devices 220 and 230 output video and/or audio corresponding to the data received from sending device 210. For example, receiving devices 220 and 230 can output video conference data received from sending device 210. The sending and receiving devices of FIG. 2 can change roles during the course of use. For example, sending device 210 may send data for a period of time and subsequently receive data from receiving device 220. Full duplex communications can also be provided between the devices of FIG. 2.

For reasons of simplicity, only the audio data sent from sending device 210 to receiving devices 220 and 230 are described, however, the present invention is equally applicable to other audio and/or video data communicated between networked devices. In one embodiment, audio data is sent from sending device 210 to receiving devices 220 and 230 in packets including a known amount of data. The packets of data further include a time stamp indicating a time offset for the beginning of the associated packet or other time indicator. In one embodiment, a time offset is calculated from the beginning of the process that is generating the audio data; however, other time indicators can also be used.

The amount of time required to play a packet can be determined using a clock signal, for example, a computer system or audio sub-system clock signal. Using the amount of time required for playback of a packet, a timing relationship between the audio input and audio output can be determined using time stamps. If, for example, the packet playback length is 60 ms for a particular audio output sub-system and the time stamps differ by more or less than 60 ms, output is not synchronized with the input. If the time stamps differ by less than 60 ms, the output device is outputting the digital audio data slower than the input device is generating digital audio data. If the time stamps differ by more than 60 ms, the output device is outputting digital audio data faster than the input device is generating digital audio data.

In order to compensate for the timing differences, the output device detects natural silence in the audio stream and modifies the time duration of the silence as necessary. If the output device is outputting digital audio slower than the input device is generating digital audio data, periods of silence can be shortened. If the output device is outputting digital audio faster than the input device is generating digital audio data, periods of silence can be lengthened.

In one embodiment, a time averaged signal strength is used to determine periods of silence; however, other techniques can also be used. If a time averaged signal strength falls below a predetermined threshold, the corresponding signal is considered to be silence. Silence can be the result of pauses between spoken sentences, for example.

In one embodiment, the present invention uses a floating threshold value to determine silence. The threshold can be adjusted in response to background noise at the audio input to provide more accurate silence detection than for a non-floating threshold. When the time averaged signal strength drops below the threshold the silence is detected. One embodiment of silence detection is described in greater detail in "Digital Cellular Telecommunications System; Voice Activity Detection (VAD), published by the European Telecommunications Standards Institute (ETSI) in October of 1996, reference RE/SMG-020632PR2.

Figure 3:
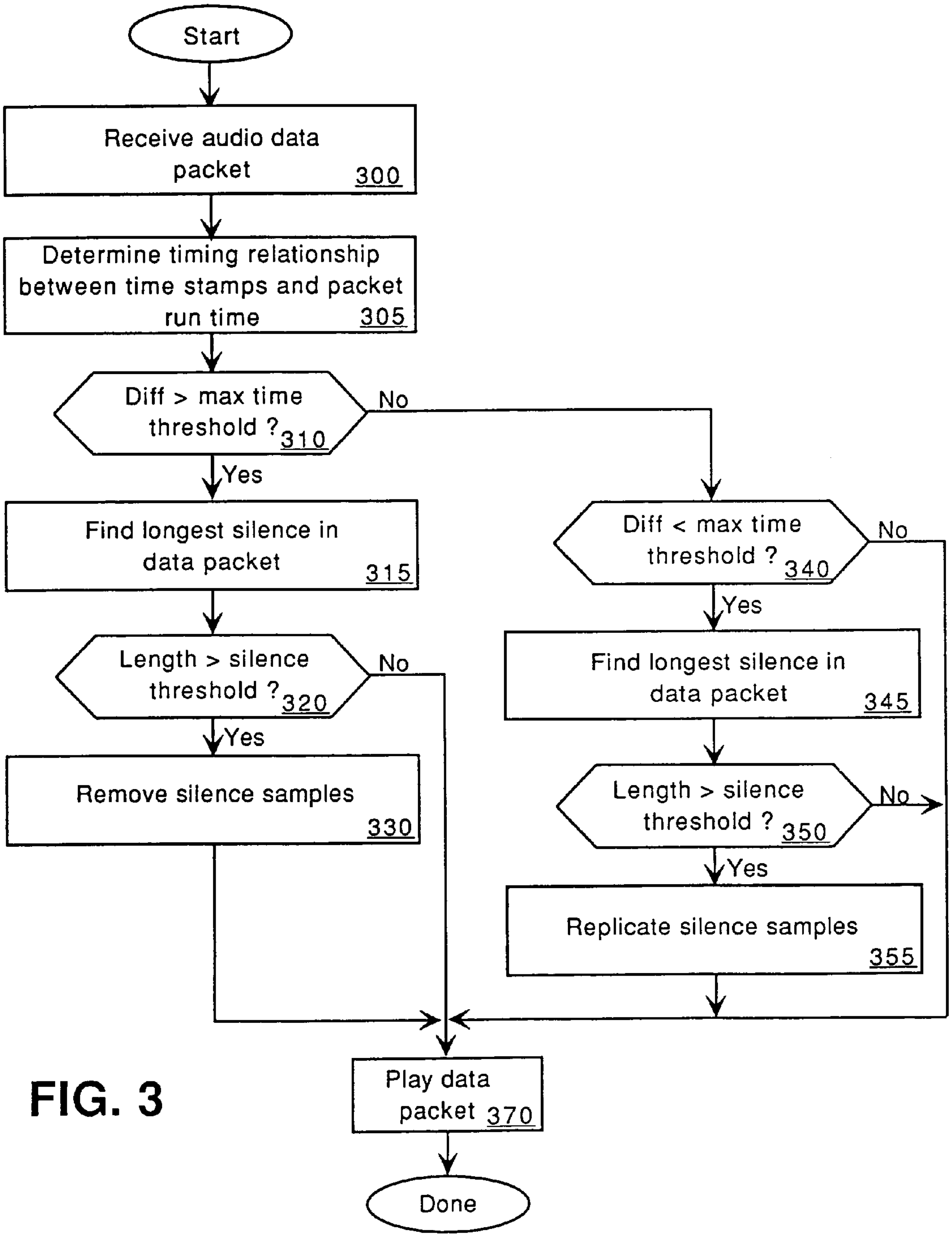
FIG. 3 is a flow diagram for digital audio compensation according to one embodiment of the present invention.

FIG. 3 is a flow diagram for digital audio compensation according to one embodiment of the present invention. The timing compensation described with respect to FIG. 3 assumes that digital audio data is communicated between devices via a packet-switched network; however, the principles described with respect to FIG. 3 can also be used to compensate for input and output differences for data communicated via a network in another manner as well as data communicated within a single device.

An audio packet is received at 300. For the description of FIG. 3 blocks of data are described in terms of packets; however, other blocks of data can also be used as described with respect to FIG. 3. In one embodiment, audio packets are encoded according to User Datagram Protocol (UDP) described in Internet Engineering Task Force (IETF) Request for Comments 768 and published Aug. 28, 1980. UDP used in connection with Internet Protocol (IP), referred to as UDP/IP, provides an unreliable network connection. In other words, UDP does not provide dividing data into packets, reassembling, sequencing, guaranteed delivery of the packets.

In one embodiment, Real-time Transport Protocol (RTP) is used to divide digital audio and/or video data into packets and communicate the packets between computer systems. RTP is described in IETF Request for Comments 1889. In an alternative embodiment Transmission Control Protocol (TCP) along with IP, referred to a TCP/IP can be used to reliably transmit data; however, TCP/IP requires more processing overhead than UDP/IP using RTP.

A timing relationship between time stamps for consecutive audio data packets and run time for a audio data packet is determined at 305. In one embodiment, time stamps from headers according to RTP are used to determine the length of time between the beginning of a data packet and the beginning of the subsequent data packet. A computer system clock signal can be used to determine the run time for a packet. If the run time equals the time difference between two time stamps, the input and output systems are synchronized. If the run time differs from the time difference between the time stamps, the audio output is compensated as described in greater detail below.

If the difference between the run time and the time stamps exceeds a maximum time threshold at 310, audio compensation is provided. In one embodiment, the maximum time threshold is the time difference between time stamps (delay) multiplied by a squeezable jitter threshold (SQJT) value that is a percentage multiplier of a desired maximum jitter delay beyond which silence periods are reduced. In one embodiment a value of 200 is used for SQJT; however, other values as well as not percentage values can be used.

The longest silence in the data packet is determined at 315. As described above, a time averaged signal strength can be used where a signal strength below a predetermined threshold is considered silence. However, other methods for determining silence can also be used. In one embodiment a silence threshold factor (STFAC) is used to determine a period of silence. The STFAC is a percentage of the silence threshold for a sample to be counted as part of a period of silence. In other words, STFAC is the percentage of the silence threshold (used to determine when a period of silence begins) that a sample must exceed in order to end the period of silence. In one embodiment, a value of 200 is used for STFAC; however, other values as well as non-percentage values can also be used.

If the length of the longest period of silence in the packet exceeds a predetermined silence threshold at 320, samples are removed from the period of silence at 330. In one embodiment, the silence threshold used at 320 is defined by a minimum squeezable packet (MSQPKT), which is a percentage of a packet that must be a run of silence before silence samples are removed to compensate for audio differences. In one embodiment a value of 25 is used for MSQPKT; however, other values as well as non-percentage values can also be used. If the longest period of silence does not exceed the predetermined silence threshold at 320, the data packet is played at 370.

In one embodiment samples are removed from the period of silence at 330. In one embodiment, a squeezable packet portion (SQPKTP) is a parameter used to determine the number of samples removed from a period of silence. SQPKTP represents a percentage of a period of silence that is removed when shortening the period of silence. In one embodiment, a value of 75 is used for SQPKTP; however, other values can also be used. Alternatively, a predetermined number of samples can be removed from a period of silence. In an alternative embodiment, samples are removed from a period of silence that is not the longest period of silence in a data packet. Samples can also be removed from multiple periods of silence. After samples are removed at 330, the modified packet is played at 370.

If, at 310, the difference between the time stamps and the run time does not exceed a maximum time threshold as described above, and is not less than a predetermined minimum threshold at 340, the data packet is played at 370.

If, at 340, the time difference is less than the predetermined minimum, the output is playing data packets faster than audio data is being generated. In one embodiment, the delay between time stamps is multiplied by a stretchable jitter threshold (STJT) value to determine whether a period of silence should be stretched. STJT is a percentage multiplier of the desired maximum jitter delay. In one embodiment a value of 50 is used for STJT; however, other values as well as non-percentage values can be used. The longest period of silence in a data packet is determined at 345. The longest period of silence is determined as described above. Alternatively, other periods of silence can be used.

If the length of the longest period of silence is not longer than the predetermined threshold at 350, the data packet is played at 370. In one embodiment a minimum stretchable packet (MSTPKT) value is used to determine if periods of silence in the packet are to be extended. MSTPKT is a minimum percentage of a packet that must be a period of silence before the packet is extended. In one embodiment a value of 25 is used for MSTPKT; however, a different value or a non-percentage value could also be used. If the period of silence is longer than the predetermined threshold at 350 samples within the period of silence are replicated at 355.

In one embodiment a stretchable packet portion (STPKTP) is used to determine the number of silence samples that are added to the packet. STPKTP is the percentage of a period of silence that is replicated to extend a period of silence. In one embodiment, a value of 100 is used for STPKTP; however, a different value or a non-percentage value can also be used. The modified packet is played at 370. Thus, the period of silence is extended to compensate for timing differences between the input and the output of audio data.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

The invention claimed is:

1. A computer system comprising:

a bus; and a processor coupled to the bus;

wherein the processor determines a timing relationship between data in an input buffer and an output buffer, and further wherein the processor determines whether a length of a period of silence is greater than a predetermined threshold value, and further wherein the processor modifies the length of the period of silence based on the timing relationship between data in the input buffer and the output buffer if the length of the period of silence is greater than the predetermined threshold value.

2. The computer system of claim 1 wherein the timing relationship between the data in the input buffer and the output buffer is determined by comparing a first time stamp for data in the output buffer, a second time stamp for data in the input buffer and a playback time for the data in the output buffer.

3. The computer system of claim 1 wherein data stored in the input buffer and data stored in the output buffer are generated within an audio sub-system.

4. The computer system of claim 1 further comprising a network interface through which data is received, the network interface coupled to the processor.

5. The computer system of claim 1 wherein the processor removes data samples from the period of silence if the timing relationship indicates that data output is slower than data input.

6. The computer system of claim 1 wherein the processor replicates data samples in the period of silence if the timing relationship indicates that data input is slower than data output.

7. A computer-readable medium containing instructions for controlling a computer system to compensate for variations in timing of data, by a method comprising:

determining a variation in timing between input data and output data;

when the determined variation indicates that the output data represents a slower rate than the input data, shortening a period of silence of the output data to compensate for the variation; and when the determined variation indicates that the output data represents a faster rate than the input data, extending a period of silence of the output data to compensate for the variation.

8. The computer-readable medium of claim 7 wherein the data is audio data.

9. The computer-readable medium of claim 8 wherein a period of silence occurs when an average signal strength of audio data is below a threshold.

10. The computer-readable medium of claim 9 wherein the threshold is adjusted to account for background noise.

11. The computer-readable medium of claim 8 wherein a period of silence occurs between spoken sentences.

12. The computer-readable medium of claim 7 wherein the input data is received from another computer system and the output data is output by the computer system.

13. The computer-readable medium of claim 7 wherein the input data and output data includes packets with each packet having associated timing information.

14. The computer-readable medium of claim 7 wherein a period of silence exceeds a threshold period.

15. The computer-readable medium of claim 14 wherein the input and output data includes packets and the threshold is based on a percent of time represented by a packet.

16. The computer-readable medium of claim 7 wherein multiple periods of silence are extended.

17. The computer-readable medium of claim 7 wherein a longest period of silence is extended.

18. The computer-readable medium of claim 7 wherein multiple periods of silence are shortened.

19. The computer-readable medium of claim 7 wherein a longest period of silence is shortened.

20. The computer-readable medium of claim 7 wherein the data is video data.

21. The computer-readable medium of claim 20 wherein the period of silence is identified from audio data corresponding to the video data.

22. The computer-readable medium of claim 20 wherein the period of silence is identified from the video data.

23. A method for compensating for a difference between sample rate and output rate of data, the method comprising:

receiving data having a sample rate;

determining whether a difference exists between the sample rate and the output rate;

identifying a period of silence within the received data; and adjusting the identified period of silence to compensate for the determined difference between the sample rate and the output rate.

24. The method of claim 23 wherein the data is audio data.

25. The method of claim 24 wherein a period of silence occurs when an average signal strength of audio data is below a threshold that is adjusted to account for background noise.

26. The method of claim 23 wherein the data includes packets with each packet having timing information.

27. The method of claim 23 wherein the adjusting includes extending the identified period of silence when the sample rate is lower than the output rate.

28. The method of claim 23 wherein the adjusting include shortening the identified period of silence when the sample rate is greater than the output rate.

29. The method of claim 23 including identifying and adjusting multiple periods of silence.

30. The method of claim 23 wherein the data is video data.

31. The method of claim 30 wherein the period of silence is identified from audio data corresponding to the video data.

32. The method of claim 30 wherein the period of silence is identified from the video data.

* * * * *